United States Patent
Tsukada et al.

(10) Patent No.: US 7,808,737 B2
(45) Date of Patent: Oct. 5, 2010

(54) MAGNETIC DISK DRIVE

(75) Inventors: Minoru Tsukada, Kanagawa (JP); Soichi Isono, Kanagawa (JP); Tomoki Oura, Kanagawa (JP); Yoshikatsu Fujii, Kanagawa (JP); Koji Takahashi, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 525 days.

(21) Appl. No.: 11/645,209

(22) Filed: Dec. 21, 2006

(65) Prior Publication Data

US 2007/0217050 A1 Sep. 20, 2007

(30) Foreign Application Priority Data

Jan. 4, 2006 (JP) ............................. 2006-000102

(51) Int. Cl.
*G11B 5/09* (2006.01)
(52) U.S. Cl. .............................. 360/51; 360/31; 360/48; 360/60; 360/75; 360/77.02
(58) Field of Classification Search ........................ None
See application file for complete search history.

(56) References Cited

U.S. PATENT DOCUMENTS

| | | | | |
|---|---|---|---|---|
| 5,825,568 A * | 10/1998 | Lee | ............................. | 360/51 |
| 5,825,580 A * | 10/1998 | Shibata | ..................... | 360/77.08 |
| 5,852,524 A * | 12/1998 | Glover et al. | .................. | 360/51 |
| 6,215,608 B1 * | 4/2001 | Serrano et al. | ................. | 360/60 |
| 6,278,571 B1 * | 8/2001 | Bui et al. | .................. | 360/77.12 |
| 6,414,809 B1 * | 7/2002 | Sakai et al. | .................... | 360/60 |
| 6,515,813 B2 * | 2/2003 | Kitazaki et al. | ............... | 360/51 |
| 6,738,205 B1 * | 5/2004 | Moran et al. | ................... | 360/17 |
| 6,975,468 B1 * | 12/2005 | Melrose et al. | ............... | 360/31 |
| 7,035,035 B2 | 4/2006 | Ito | | |
| 7,054,083 B2 * | 5/2006 | Ehrlich | ......................... | 360/29 |
| 7,342,735 B2 * | 3/2008 | Hashimoto et al. | ........... | 360/75 |
| 7,532,424 B2 * | 5/2009 | Sai et al. | ....................... | 360/51 |
| 2002/0054449 A1 * | 5/2002 | Despain et al. | .......... | 360/77.07 |

(Continued)

FOREIGN PATENT DOCUMENTS

JP 2004-139677 5/2004

*Primary Examiner*—Dismery E Mercedes
(74) *Attorney, Agent, or Firm*—Rambod Nader; Townsend and Townsend and Crew

(57) ABSTRACT

Embodiments of the present invention provide a magnetic disk drive capable of controlling write/read positions by a method that takes the disturbance in the circumferential direction of a magnetic disk into consideration, thereby making it possible to improve the positioning accuracy. A magnetic disk drive in accordance with an embodiment of the present invention comprises: a magnetic recording medium on which information is written to each track thereof, the recording medium having a servo signal formed in the each track at specified intervals; a magnetic head including a read head for reading a signal from the magnetic recording medium, and a write head for writing information to the magnetic recording medium. At the time of writing/reading information by the magnetic head, a servo signal is detected from among signals read out by the read head. Information about intervals of the detection is continuously acquired on the basis of the information about the servo-signal detection intervals that have been continuously acquired. The amount of rotational fluctuations of a magnetic disk is calculated; and if the amount of rotational fluctuations exceeds the predetermined allowable range, specified processing relating to at least one of writing and reading is stopped.

1 Claim, 3 Drawing Sheets

U.S. PATENT DOCUMENTS

2002/0149868 A1* 10/2002 Nakasato .................... 360/51
2003/0007276 A1* 1/2003 Satoh ........................ 360/63
2004/0114269 A1* 6/2004 Ito .............................. 360/75
2004/0156137 A1* 8/2004 Settje et al. .................. 360/51

* cited by examiner

MAGNETIC DISK DRIVE

CROSS-REFERENCE TO RELATED APPLICATION

The instant nonprovisional patent application claims priority to Japanese Patent Application No. 2006-000102, filed Jan. 4, 2006 and incorporated by reference herein for all purposes.

BACKGROUND OF THE INVENTION

Embodiments in accordance with the present invention relate to magnetic disk drives such as a hard disk.

Hard disks adopt a method for reliably writing data to a desired area on a rotating magnetic disk. This method is called a sector servo system. According to the sector servo system, servo information is written at a constant angular interval to each track on a surface of the magnetic disk. A circuit unit in a hard disk drive reads and detects this servo information, and then reads or writes data with reference to a position of the servo information.

Here, if the rotation center of a magnetic disk deviates (if the rotation center is shifted), intervals of detecting servo information fluctuate, which may exert an influence on the positioning accuracy at the time of reading or writing data.

For this reason, heretofore, fluctuations in servo interval time are detected and the servo interval time is subjected to feedforward correction in expectation of the fluctuations (for example, as disclosed in Japanese Patent Application Laid-Open No. 2004-139677).

In recent years, not only computers but also small-size information equipment including mobile terminals and car navigation systems have made use of a hard disk as means for providing large storage capacity. Under such circumstances, when a hard disk drive is implemented in a mobile terminal or the like, the hard disk drive may suffer a shock if the mobile terminal drops. Likewise, when a hard disk drive operates while a vehicle is running, the hard disk drive may be subject to consecutive disturbance.

In particular, if the mobile terminal is fixed to one's arm with an armband, or if the mobile terminal is moved with the mobile terminal held by hand, a disturbance may be applied to the mobile terminal which can be described mathematically by a large arc or a parabolic equation. The disturbance as described above acts in the circumferential direction (in the rotational direction, i.e., in the angular speed direction) of the magnetic disk, which causes fluctuations in rotation of the magnetic disk. This may exert an influence on the positioning accuracy of write and read positions.

However, with conventional hard disk drives, the disturbance in the circumferential direction of a magnetic disk is not taken into consideration. Therefore, when such disturbance causes servo intervals to fluctuate, correction processing for the disk shift may be inaccurately performed. As a result, it may become more difficult to control write and read positions.

BRIEF SUMMARY OF THE INVENTION

Embodiments in accordance with the present invention provide a magnetic disk drive that is capable of controlling write/read positions by a method that takes the disturbance in the circumferential direction of a magnetic disk into consideration, thereby making it possible to improve the positioning accuracy. A magnetic disk drive in accordance with an embodiment of the present invention comprises: a magnetic recording medium on which information is written to each track thereof, the recording medium having a servo signal formed in the each track at specified intervals; a magnetic head including a read head for reading a signal from the magnetic recording medium, and a write head for writing information to the magnetic recording medium.

In accordance with one embodiment, at the time of writing/reading information by the magnetic head, a servo signal is detected from among signals read out by the read head. Information about intervals of the detection is continuously acquired on the basis of the information about the servo-signal detection intervals that have been continuously acquired. The amount of rotational fluctuations of a magnetic disk is calculated; and if the amount of rotational fluctuations exceeds the predetermined allowable range, specified processing relating to at least one of writing and reading is stopped.

For a more complete understanding of the present invention, reference is made to the following detailed description taken in conjunction with the accompanying drawings.

DETAILED DESCRIPTION OF THE INVENTION

An object of an embodiment in accordance with the present invention relates to providing a function of detecting rotational fluctuations of a magnetic disk caused by the disturbance in the circumferential direction of the magnetic disk (that is, fluctuations in servo intervals), and to preventing data from being erroneously read or written as a result of the rotational fluctuations caused by the disturbance.

According to one embodiment of the present invention, a magnetic disk drive comprises: a magnetic recording medium on which information is written to each track thereof, the recording medium having a servo signal formed in the each track at specified intervals; a magnetic head including a read head for reading a signal from the magnetic recording medium, and a write head for writing information to the magnetic recording medium; and a control unit for, when the magnetic head writes/reads information, detecting a servo signal from among signals read out by the read head, and for continuously acquiring information about intervals of the detection, and then for, on the basis of the information about the servo-signal detection intervals that has been continuously acquired, executing specified processing relating to at least one of writing and reading.

Figure 1:
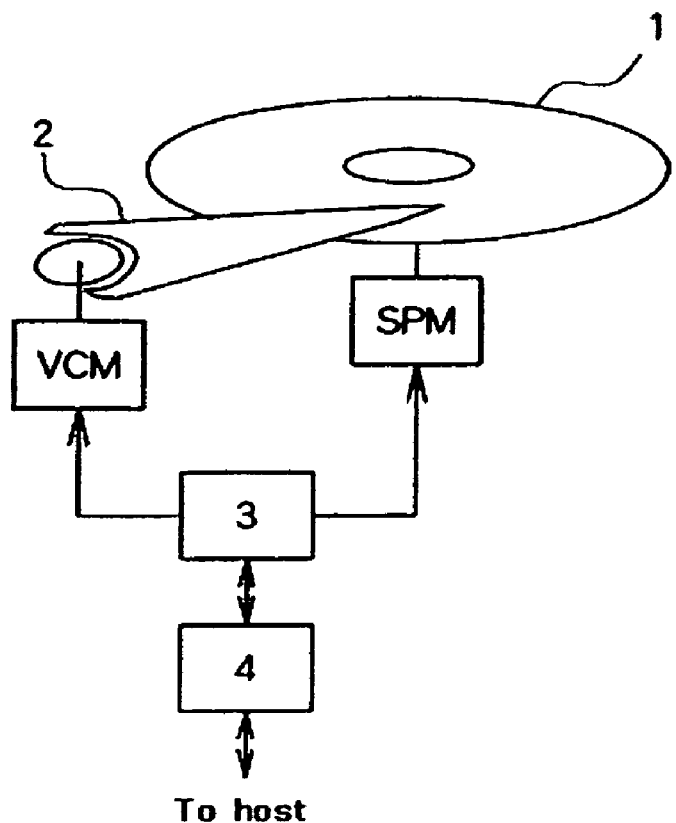
FIG. 1 is a block diagram illustrating a configuration example of a magnetic disk drive according to an embodiment of the present invention.

Embodiments of the present invention will be described with reference to drawings described below. As shown in FIG. 1, a magnetic disk drive according to an embodiment of the present invention includes a magnetic disk medium 1, a magnetic head assembly 2, a circuit unit 3, and an interface unit 4. The magnetic disk drive is connected to a host.

The magnetic disk medium 1 has a disc-like shape. Information is written to each track that is spirally or concentrically formed in the circumferential direction beforehand. In addition, a servo signal is written to the track at specified intervals. This magnetic disk medium 1 is rotatably driven by a spindle motor (SPM). The center position of the rotation is set substantially at the center of the magnetic disk medium 1. However, for the reason of manufacturing, the center position of the rotation usually deviates from the center of the magnetic disk medium 1.

The magnetic head assembly 2 is provided with a magnetic head including a read head and a write head on a free end thereof. The write head writes a signal to the magnetic disk medium 1, and the read head reads out a signal written to the magnetic disk medium 1 and then outputs the signal. This magnetic head assembly 2 is supported so that the magnetic head assembly 2 can pivotally move. The magnetic head assembly 2 is pivotably driven by the voice coil motor (VCM) so that the magnetic head is moved substantially in the radial direction of the magnetic disk medium 1.

Figure 2:
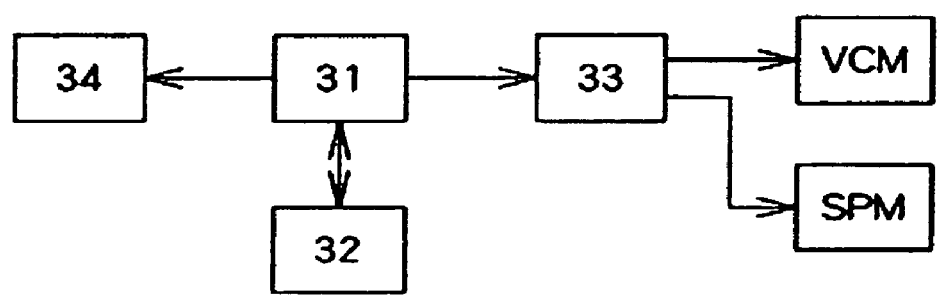
FIG. 2 is a block diagram illustrating a configuration example of a circuit unit of a magnetic disk drive according to an embodiment of the present invention.

As shown in FIG. 2, the circuit unit 3 includes a controller 31, a memory 32, a driver 33, and an amplifier 34. The memory 32, which includes an EEPROM (electrically erasable ROM), stores a program that is executed by the controller 31. In addition, the memory 32 includes a RAM, and accordingly operates as a working memory for the controller 31. The driver 33 drivingly controls the spindle motor (SPM) and the voice coil motor (VCM) according to an instruction inputted from the controller 31. The amplifier 34 amplifies a signal inputted from the controller 31, and then outputs the amplified signal to the magnetic head. Moreover, the amplifier 34 amplifies a signal that is output from the magnetic head, and then outputs the amplified signal to the controller 31.

A CPU, or the like, is used as the controller 31, which operates according to the program stored in the memory 32. The controller 31 encodes data inputted from the host side, and then outputs the encoded data to the amplifier 34. In addition, the controller 31 controls the driver 33 so that the magnetic head is moved to a position at which the encoded data is to be written. Moreover, on the receipt of an instruction to read out data from the magnetic disk medium 1, the controller 31 controls the driver 33 according to the instruction so that the magnetic head is moved to a position at which data is to be read out is written. As soon as the data which has been read out is inputted, the controller 31 outputs the data to the host.

Further, at the time of writing/reading information by the magnetic head, the controller 31 detects a servo signal from among signals read out by the read head, and continuously acquires information about intervals of detecting the servo signal, and then executes, for example, processing of controlling the timing of writing data on the basis of the information about the servo-signal detection intervals that has been continuously acquired.

Figure 3:
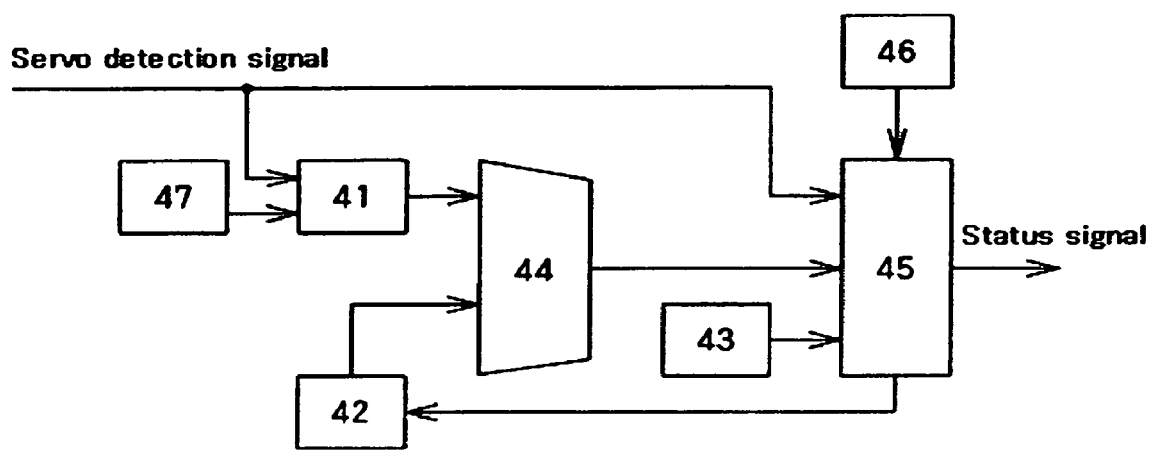
FIG. 3 is a functional block diagram illustrating a circuit unit of a magnetic disk drive according to an embodiment of the present invention.

As shown in FIG. 3, from a functional point of view, the controller 31 for executing this processing includes a servo interval counter 41, a servo-interval correction value setting register 42, a fluctuation allowable value setting register 43, a difference computing element 44, a comparison controller 45, a servo-interval expected value setting register 46, and a reference clock generator 47. The reference clock generator 47 alternately switches between a signal in a H (high) state and a signal in a L (low) state at each specified timing so as to output each signal as a reference clock signal.

As soon as the controller 31 detects a servo signal, the controller 31 generates a servo detection signal, and then inputs the servo detection signal into the servo interval counter 41.

In some embodiments of the present invention, every time the reference clock signal generated by the reference clock generator 47 enters a specified state (for example, every time a state of the reference clock signal changes from the low state to the high state), the servo interval counter 41 increments a counter value by one. In addition, when the servo detection signal is inputted, the servo interval counter 41 outputs the counter value at this point of time to the difference computing element 44, and also resets the counter value to "0".

The servo-interval correction value setting register 42 is a register for storing a servo-interval correction value. A value stored in this register is an expected value of the counter value of the servo interval counter 41 at a point of time at which a servo detection signal is inputted next. Every time a servo detection signal is inputted, a value updated on the basis of the servo-interval correction value calculated by the comparison controller 45 is set in the servo-interval correction value setting register 42. Operation at the time of the update will be described later.

When a servo detection signal is inputted, the fluctuation allowable value setting register 43 stores an allowable threshold value of a difference value between a value stored in the servo-interval correction value setting register 42 and a counter value which the servo interval counter 41 outputs. In this embodiment, an absolute value of the difference is set and stored beforehand. Here, if a value W is set, an allowable range becomes a range of ±W. Incidentally, it may also be so configured that if a set value is required to differ depending on whether a difference value is positive or negative, an allowable threshold value which satisfies each condition is stored.

The difference computing element 44 calculates the difference between the value stored in the servo-interval correction value setting register 42 and the counter value output by the servo interval counter 41, and then outputs the calculated difference value. In this embodiment of the present invention, the calculation is performed so that if the counter value output by the servo interval counter 41 is larger than a value of the servo-interval correction value setting register 42, the difference value becomes positive, whereas if the counter value is smaller than the value of the servo-interval correction value setting register 42, the difference value becomes negative. Incidentally, if seek operation (operation of moving between tracks) is performed after the last calculation of the difference value, the difference computing element 44 subtracts the length of time spent for the seek operation.

In some embodiments of the present invention, every time a servo detection signal is inputted, the comparison controller 45 generates and outputs a status signal, and also calculates and outputs a relative servo interval expected value, on the basis of the value stored in the servo-interval correction value setting register 42, the value stored in the fluctuation allowable value setting register 43, the difference value output by the difference computing element 44, and a value stored in the servo-interval expected value register 46. The operation of the comparison controller 45 will be described later.

At a point of time at which a servo detection signal is inputted, an expected value of a counter value output by the servo interval counter 41 is set beforehand in the servo-interval expected value setting register 46. Here, a servo-interval expected value, which takes the amount of disk shift in each servo signal into consideration, is stored. The value which is set in the servo-interval expected value setting register 46 may be determined by calculation on a servo basis, or may also be updated, during the operation of detecting a servo signal, on the basis of a table obtained by calculation in advance.

In accordance with embodiments of the present invention, this table is calculated as described below. To be more specific, on the assumptions that the number of servo signals on a data recording surface of the magnetic disk medium 1 is 100, and that the number of revolutions of a disk is 4200 per minute, an interval Ts between adjacent servos is expressed as follows:

$$Ts=(60/4200\times1000000)/100=142.857 \text{ } \mu sec$$

Here, on the assumption that the radius of a track of interest on the magnetic disk medium 1 is $R_0$, if the rotation center is shifted by the distance $\Delta x$ relative to the true center of the circle, a radius vector R is expressed as the following equation:

$$R=\sqrt{R_0^2+2R_0\Delta x\cdot\cos\theta+\Delta x^2} \quad \text{Equation 1}$$

where $\theta$ is an angle when the point of interest is viewed from the true center. When this radius vector R becomes larger than $R_0$, the same effect as that obtained by the increased radius is produced. Accordingly, the angular speed increases, which is the same state as that when the number of revolutions of the disk increases apparently. On the other hand, if the radius vector R becomes smaller than $R_0$, this results in the same state as that when the number of revolutions of the disk decreases apparently. In addition, the influence of $\Delta x$ becomes larger with decrease in $R_0$. The influence of disk shift, therefore, becomes larger towards the inner circumference of the disk.

As described above, using the radius vector R by the disk shift, fluctuations in the number of revolutions can be calculated as follows:

$$rpm=r\times R/R_0$$

where r is the inherent number of revolutions; in this example, r=4200.

Then, the fluctuations in the number of revolutions are converted into fluctuations in servo intervals by the following equation:

$$\Delta T=(60/(rpm)\times1000000)/100$$

Based on this calculation, for example, with respect to a reference R, each value of $\Delta T$ obtained when $\theta$ is changed at intervals of 30 degrees is stored as a table beforehand. Then, the value of $\Delta T$ is updated according to the detection of a servo signal.

Described next will be operation of updating a value that is set in the servo-interval correction value setting register 42 by the comparison controller 45.

Figure 4:
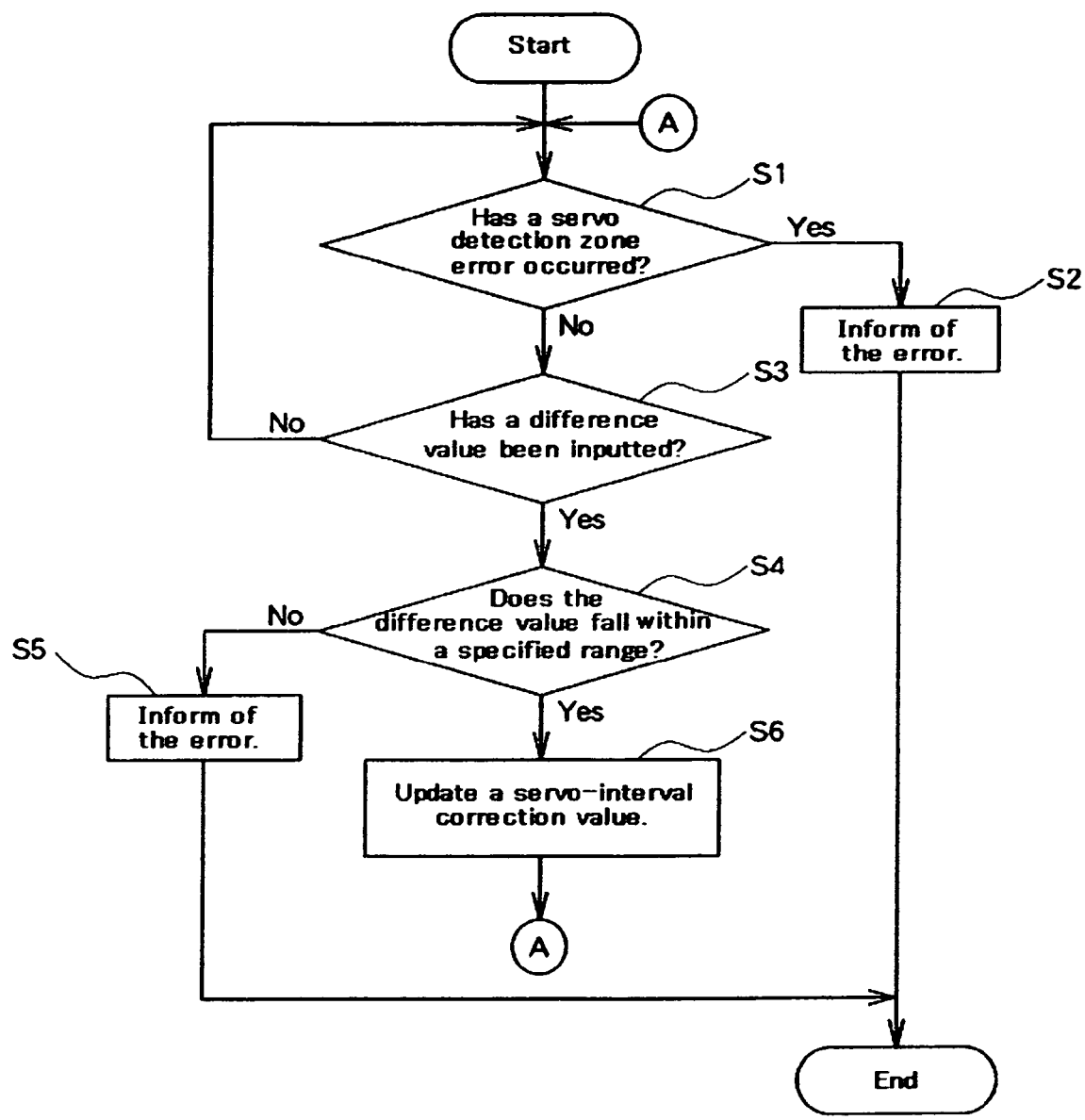
FIG. 4 is a flowchart illustrating an operation example of a magnetic disk drive according to an embodiment of the present invention.

The comparison controller 45 executes processing shown in FIG. 4. First of all, a check is made as to whether or not a servo signal has been detected outside a zone (servo detection zone) in which a predetermined servo signal can be detected (whether or not a servo detection zone error has occurred) due to the abnormality of a servo circuit, the damage of a recording surface of the magnetic disk medium 1, the occurrence of a data error, or the like (S1).

If the comparison controller 45 judges that a servo detection zone error has occurred, the comparison controller 45 outputs a status signal that expresses a servo detection error (S2), and then the processing ends.

On the other hand, if the comparison controller 45 judges that a servo detection zone error has not occurred, a check is made as to whether or not a difference value has been inputted from the difference computing element 44 (S3). If the difference value has not been inputted, the process returns to the step S1, and the processing continues.

In addition, in the step S3, if a difference value is inputted (hereinafter this difference value is defined as D), the comparison controller 45 checks whether or not the difference value D falls within a range specified by a value set in the fluctuation allowable value setting register 43 (S4). For example, as described above, if an allowable range is specified by an absolute value W in the fluctuation allowable value setting register 43, a judgment is made as to whether or not $|D|\leqq W$. Here, $|D|$ means that an absolute value of D is calculated.

If the difference value D does not fall within the range specified by the value set in the fluctuation allowable value setting register 43, the comparison controller 45 outputs, as a status signal, an error (servo interval fluctuation error) expressing that fluctuations in servo intervals are large (S5), and then the processing ends.

On the other hand, if the difference value D falls within the range specified by the value set in the fluctuation allowable value setting register 43, the comparison controller 45 updates a servo-interval correction value (S6). Here, depending on whether the difference value D is positive or negative, the servo-interval correction value is updated to different values as described below.

To be more specific, if the difference value D is a negative value, the comparison controller 45 acquires an expected value E set in the servo-interval expected value setting register 46, and then calculates a corrected expected value M=E−D. In addition, if the difference value D is a positive value, the comparison controller 45 acquires an expected value E set in the servo-interval expected value setting register 46, and then calculates a corrected expected value M=E+D.

The comparison controller 45 stores the corrected expected value M, which has been calculated in this manner, in the servo-interval correction value setting register 42 so that a value stored in the servo-interval correction value setting register 42 is updated. Then, the process returns to the step S1, and the processing continues.

Incidentally, when a servo interval fluctuation error is output in the step S5, the controller 31 stops data write operation and data read operation that are being executed at this point of time.

Moreover, if a signal notifying of the occurrence of an error is inputted from other circuits including a hard disk controller, the comparison controller 45 stops the processing. Further, when the comparison controller 45 is allowed to continue the processing, the comparison controller 45 continues the processing starting from the step S1.

During data write operation, on the basis of the corrected expected value acquired by correcting the expected value of detection intervals, the controller 31 allows the comparison controller 45 to execute specified processing relating to at least one of writing and reading, the corrected expected value being continuously updated (here, every time a servo signal is detected). For example, by dividing the corrected expected value by the number of sectors to be formed between servo signals, information about the occurrence timing of a sector pulse is acquired. Then, with reference to a reference clock signal of the reference clock generator 47, the controller 31 generates and outputs a sector timing pulse. Moreover, the controller 31 writes or reads information for each sector specified by this sector timing pulse.

Incidentally, an expected value of servo intervals set in the servo-interval expected value setting register 46 may also differ on a zone basis or on a track basis. In this case, in the processing of the step S6, the comparison controller 45 acquires an expected value that is set in association with a track, or a zone, at which the magnetic head is located at this point of time, and thereby updates the servo-interval correction value.

In addition, although a value which takes the disk shift of the magnetic disk medium 1 into consideration is set as an expected value of servo intervals to be set in the servo-interval expected value setting register 46 here, this is not always necessary. This is because corrections including the disk shift are made by subsequent processing of the controller 31, and the like.

Moreover, although the controller 31 sets the expected value of servo intervals by means of software here, a functional block shown in FIG. 3 may also be implemented by means of hardware.

According to this embodiment of the present invention, it becomes possible to perform the control on the basis of fluctuations in intervals of servo detection, the fluctuations caused by factors such as the disturbance during operation. In addition, even if the above configuration is implemented by means of hardware, the implementation can be achieved by use of a comparator and an adder-subtracter. Therefore, the overhead caused by adding the circuits is also relatively low.

Furthermore, in this embodiment of the present invention, write/read positions are controlled by a method that takes the disturbance in the circumferential direction of the magnetic disk into consideration. As a result, it is possible to improve the positioning accuracy.

While the present invention has been described with reference to specific embodiments, those skilled in the art will appreciate that different embodiments may also be used. Thus, although the present invention has been described with respect to specific embodiments, it will be appreciated that the present invention is intended to cover all modifications and equivalents within the scope of the following claims.

What is claimed is:

1. A magnetic disk drive comprising:
   a magnetic recording medium on which information is written to each track thereof, the recording medium having a servo signal formed in the each track at specified intervals;
   a magnetic head including a read head for reading a signal from the magnetic recording medium, and a write head for writing information to the magnetic recording medium;
   a control unit for, when the magnetic head writes/reads information, detecting a servo signal from among signals read out by the read head, and for continuously acquiring information about intervals of the detection, and then for, on the basis of the information about the servo-signal detection intervals that has been continuously acquired, executing specified processing relating to at least one of writing and reading;
   an expected value storing section for storing an expected value of predetermined intervals of the servo signal, the expected value updated based upon the servo signal;
   wherein if a difference between the expected value of the detection intervals stored in the expected value storing section and the detection intervals indicated by the information which has been continuously acquired does not exceed a specified allowable threshold value, said controller calculates a corrected expected value by subjecting the expected value to correction, and then the information about the corrected expected value is used for specified processing relating to at least one of writing and reading, whereas if the difference between the expected value of the detection intervals stored in the expected value storing part and the detection intervals indicated by the information which has been continuously acquired exceeds the specified threshold value, said controller stops the specified processing relating to at least one of writing and reading;
   wherein the control unit further comprises a comparison controller, a servo-interval expected value setting register, a servo-interval correction value setting register, a fluctuation allowable value setting register, and a difference computing element,
   the difference computing element configured to output a difference value based on a third value stored in a servo interval counter and a fourth value stored in the servo-interval correction value setting register;
   the comparison controller configured to receive as inputs, the servo signal, the difference value, a first value stored in the servo interval expected value setting register, and a second value stored in the fluctuation allowable value setting register,
   the comparison controller further configured to generate as output a status signal based on the servo signal and a relative servo interval expected value;
   wherein the relative servo interval expected value is based on the first value, the second value and the difference value; wherein the relative servo interval expected value is fed back to the servo-interval correction value setting register to update the fourth value.

* * * * *